United States Patent
Nakamura (10) Patent No.: US 7,822,133 B2
(45) Date of Patent: Oct. 26, 2010

(54) ORTHOGONAL FREQUENCY DIVISION MULTIPLEXING (OFDM) RECEIVER, OFDM RECEPTION METHOD AND TERRESTRIAL DIGITAL RECEIVER

(75) Inventor: Yoshiaki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 708 days.

(21) Appl. No.: 11/725,419

(22) Filed: Mar. 19, 2007

(65) Prior Publication Data

US 2007/0217535 A1 Sep. 20, 2007

(30) Foreign Application Priority Data

Mar. 20, 2006 (JP) ............... 2006-077355

(51) Int. Cl.
*H04K 1/10* (2006.01)

(52) U.S. Cl. .............. 375/260; 375/340; 375/347; 370/203; 370/206; 370/208; 370/210; 370/335; 370/342; 455/101; 455/132; 455/296; 455/500

(58) Field of Classification Search .............. 375/260, 375/340, 347; 370/203, 208, 210, 335, 342
See application file for complete search history.

(56) References Cited

U.S. PATENT DOCUMENTS

| | | | |
|---|---|---|---|
| 5,131,006 A | | 7/1992 | Kamerman et al. |
| 5,239,541 A | * | 8/1993 | Murai .................. 370/345 |
| 5,940,452 A | * | 8/1999 | Rich .................... 375/347 |
| 6,731,921 B1 | * | 5/2004 | Militz et al. .......... 455/277.2 |
| 2002/0191535 A1 | * | 12/2002 | Sugiyama et al. ....... 370/208 |
| 2003/0161428 A1 | * | 8/2003 | Garrett et al. ......... 375/368 |
| 2004/0202133 A1 | * | 10/2004 | Filipovic ............... 370/332 |
| 2005/0129155 A1 | * | 6/2005 | Hoshino ................ 375/347 |
| 2005/0254608 A1 | | 11/2005 | Lee et al. |
| 2006/0114812 A1 | * | 6/2006 | Kim et al. ............. 370/206 |
| 2007/0281654 A1 | | 12/2007 | Choi |

FOREIGN PATENT DOCUMENTS

JP 2003-229830 A 8/2003

OTHER PUBLICATIONS

Related U.S. Appl. No. 11/729,240, filed Mar. 27, 2007 Inventor: Yoshiaki Nakamura, Title: Orthogonal Frequency Division Multiplexing (OFDM) Receiver, OFDM Reception Method and Terrestrial Digital Receiver.

* cited by examiner

*Primary Examiner*—David C Payne
*Assistant Examiner*—Leon Flores
(74) *Attorney, Agent, or Firm*—Holtz, Holtz, Goodman & Chick, PC (57) ABSTRACT

In an OFDM receiver, one of a plurality of antennas is selected based on a ratio X of two moving average integration values (first moving average integration value and second moving average integration value) that are calculated from a non-delay symbol and a delay symbol. It could be said that the second moving average integration value represents excessive false information (that is, whether the state of the transmission line is good). Accordingly, determination of the ratio X between the second moving average integration value and the first moving average integration value and selection of one of the plurality of antennas based on the ratio X enables judgment on whether the state of the transmission line is good even during a period other than a guard interval period Tg, that is, during an effective symbol period Tu.

10 Claims, 8 Drawing Sheets

| SYMBOL NUMBER | 1 | 2 | 3 | 4 | 5 | 6 |
|---|---|---|---|---|---|---|
| C/N RATIO | 1 | 3 | 5 | 7 | 9 | 11 |
| INTEGRATION VALUE WITHIN GUARD INTERVAL (FIRST MOVING AVERAGE INTEGRATION VALUE) | 5400 | 5280 | 5180 | 5115 | 5100 | 5040 |
| INTEGRATION VALUE OUTSIDE GUARD INTERVAL (SECOND MOVING AVERAGE INTEGRATION VALUE) | 600 | 480 | 370 | 330 | 300 | 280 |
| RATIO X | 9 | 11 | 14 | 15.5 | 17 | 18 |

ORTHOGONAL FREQUENCY DIVISION MULTIPLEXING (OFDM) RECEIVER, OFDM RECEPTION METHOD AND TERRESTRIAL DIGITAL RECEIVER

CROSS-REFERENCE TO RELATED APPLICATION

This application is based upon and claims the benefit of priority from the prior Japanese Patent Application No. 2006-077355, filed 20 Mar. 2006, the entire contents of which is incorporated herein by reference.

BACKGROUND OF THE INVENTION

1. Field of the Invention

The present invention relates to an Orthogonal Frequency Division Multiplexing (OFDM) receiver, an OFDM reception method and a terrestrial digital receiver. Particularly, it relates to an OFDM receiver, an OFDM reception method and a terrestrial digital receiver applying antenna diversity.

2. Description of the Related Art

The terrestrial digital broadcasting employs a modulation method of Orthogonal Frequency Division Multiplexing (OFDM). OFDM is one form of the multi-carrier methods, that is, the modulation methods of transmitting information with a lot of carriers. Accordingly, it is less subject to the transmission line (especially, the multipath) compared to the single carrier method. In addition, the OFDM has a buffering period called a guard interval in the head portion of a single unit of the transmission information. Also in this respect, OFDM is considered multipath resistant.

However, the functions (the multi-carrier and the guard interval) that OFDM has by nature are not sufficient for a mobile-type OFDM receiver which is likely to be used under a severe environment such as in a vehicle that is traveling at a high speed. Because of this, other countermeasure technology against multipath, typically, antenna diversity, is used in combination.

As an example of an OFDM receiver applying the antenna diversity, an art (hereinafter denoted as a "conventional prior art") disclosed in Japanese Laid-Open Patent Publication No. 2003-229830 is known. The conventional prior art receives an OFDM signal with a plurality of antennas, determines a correlation value between a down-converted OFDM signal in the IF bands for each antenna and a delay OFDM signal which is delayed from the OFDM signal by the amount equivalent to a single effective symbol, calculates a Carrier to Noise ratio (C/N ratio) (that is, the ratio of the addition noise electricity to the signal electricity at the reception point) based on the correlation value, selects an equalization carrier signal with the highest C/N ratio among carrier signals of the same number that are acquired from each branch circuit, and decodes it.

As mentioned above, the conventional prior art "determines a correlation value between each down-converted OFDM signal in the IF band for each antenna and a delay OFDM signal which is delayed from the OFDM signal by the amount corresponding to a single effective symbol, calculates a C/N ratio Carrier to Noise ratio (C/N ratio)" based on the correlation value, which is, put briefly, interpreted as "using the information of the guard interval.

Figure 8A:
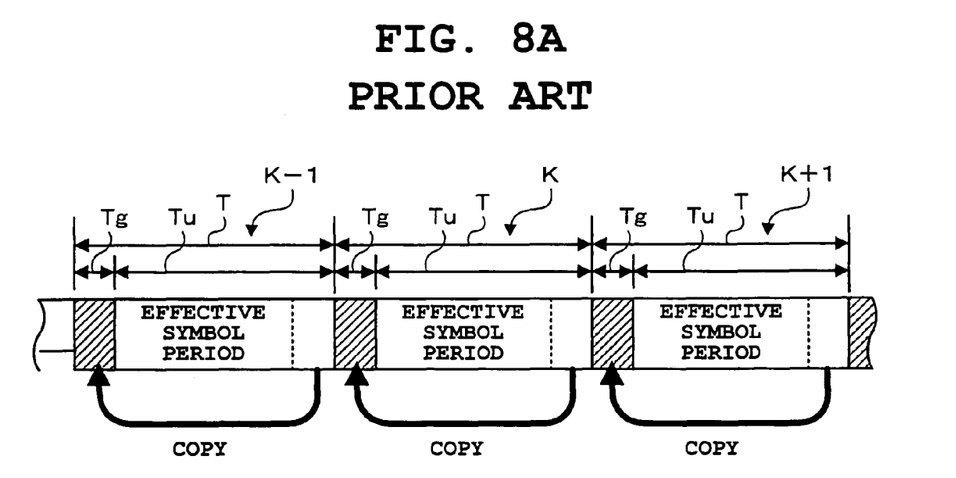
FIG. 8A is a conceptual drawing of a guard interval in the conventional prior art.

FIG. 8A is a conceptual drawing of a guard interval. Three consecutive three symbols (K−1, K, K+1) in terms of time are now assumed as shown in FIG. 8A. K denotes a current symbol, K−1 denotes a previous symbol in terms of time, and K+1 denotes a subsequent symbol K in terms of time. Lengths of individual symbol periods T are identical, and, for example, the length of the symbol period T of the terrestrial digital broadcasting is 1.008 μs (in the case of Mode 3). Every symbol is comprised of an effective symbol period Tu in which transmission information is housed and a guard interval period Tg (hatched portion) with a constant length which has been added to a head portion of the effective symbol period Tu. Information of some (the end portion) of the effective symbol period Tu subsequent to the guard interval period Tg is copied to the guard interval period Tg of each symbol.

Figure 8B:
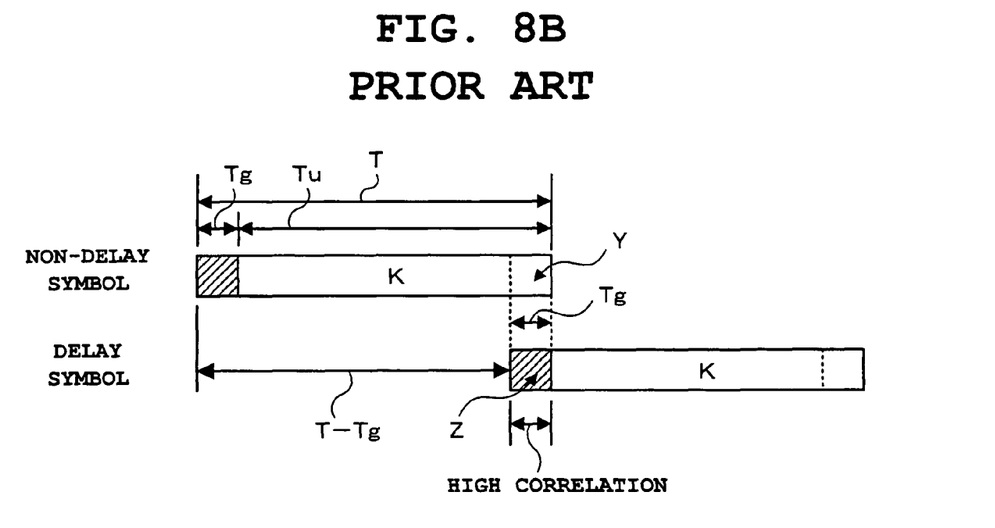
FIG. 8B is a conceptual drawing on use of the guard interval information in the conventional prior art.

FIG. 8B is a conceptual drawing on use of the guard interval information in the conventional prior art. In FIG. 8B, a non-delay symbol and a delay symbol are the identical symbol (for example, Symbol K). The delay symbol is a symbol delayed from Symbol K by a predetermined period of time (T−Tg). The delay symbol is equivalent to the "delay OFDM signal" in the conventional prior art. Next, when correlation of the two symbols (non-delay symbol and delay symbol) is evaluated, the evaluated value is large at a superimposed period of the end portion of the effective symbol of the non-delay symbol and the guard interval period Tg of the delay symbol (that is, the superimposed period of Y and Z). This is because the information of Y and Z is originally identical.

The conventional prior art as mentioned above can be interpreted as an art that evaluates the correlation on Y and Z based on the principle, and selects an equalization carrier signal with the highest C/N ratio and decodes it.

However, the following two points are pointed out for the conventional prior art. First, diversity of the conventional prior art is equivalent to a so-called composition diversity that selects the signal with the best C/N ratio among the signals that have been received with a plurality of antennas. Although the composition diversity is superior in performance to the method of switching a plurality of antennas (i.e., selection diversity), it has a drawback of increase in hardware scale. Accordingly, problems such as increase in weight of the device, power consumption and manufacturing cost are unavoidable.

Second, the conventional prior art evaluates the correlation only during the guard interval period Tg. In other words, it does not evaluate the correlation during the other period (i.e., effective symbol period Tu). Accordingly, if, for example, the state of the transmission line fluctuates suddenly in the effective symbol period Tg, the fluctuation cannot be responded to immediately, and therefore instantaneous symbol loss may be caused. This drawback cannot be overlooked particularly for an OFDM receiver which may be used in a vehicle traveling at a high speed. This is because a characteristic of the transmission line significantly fluctuates during the extremely short period corresponding to the traveling speed.

SUMMARY OF THE INVENTION

The present invention has been made in light of the foregoing first and second drawbacks. Objects of the present invention are to enable application of selection diversity which does not increase hardware scale and enable switching (selection) of the antenna even during the effective symbol period which is other than the guard interval, and therefore, to provide an OFDM receiver, an OFDM reception method and a terrestrial digital receiver with excellent instantaneous antenna selection and at a low cost.

In accordance with an aspect of the present invention, there is provided an OFDM receiver comprising: non-delay symbol output means for outputting a symbol of an OFDM signal that has been inputted as a non-delay symbol; delay symbol output means for delaying the symbol of the OFDM signal by a certain period of time T−Tg which is equivalent to a difference between a symbol period T of the inputted OFDM signal and a guard interval period Tg, and outputting the symbol as a delay symbol; first calculation means for calculating a moving average integration value (first moving average integration value) of the non-delay symbol and the delay symbol during the guard interval period Tg; second calculation means for calculating a moving average integration value (second moving average integration value) of the non-delay symbol and the delay symbol during an effective symbol period Tu subsequent to the guard interval period Tg; third calculation means for calculating a ratio X between the first moving average integration value and the second moving average integration value; and selection signal generation means for generating a selection signal for selecting one of a plurality of antennas based on the ratio X calculated by the third calculation means.

In the present invention, a selection signal for selecting one of the plurality of antennas based on a ratio X of the two moving average integration values (first moving average integration value and second moving average integration value) calculated from the non-delay symbol and the delay symbol is created.

The first moving average integration value is high (with high correlation) because of identity of the information of the guard interval period Tg. (The information of the guard interval period Tg is identical with the information of the end portion of the effective symbol period Tg following that.) On the other hand, the second moving average integration value is low (with low correlation) in normal cases, but it is rather high for some cases depending on the state of the transmission line. The expected reason for this is that false information is added to the original information (true information) of the effective symbol period Tg affected by the multipath or the like, and correlation stochastically increases because of the false information.

As mentioned above, it can be said that the second moving average integration value represents excessive false information, that is, whether the state of the transmission line is good. Therefore, determination of the ratio X between the second moving average integration value and the first moving average integration value and selection of one of the plurality of antennas based on the ratio X enables judgment on whether the state of the transmission line is good for the period other than the guard interval period Tg, that is, for the effective symbol period Tu.

In accordance with another aspect of the present invention, there is provided an Orthogonal Frequency Division Multiplexing (OFDM) reception method comprising: a non-delay symbol output process for outputting a symbol of an OFDM signal that has been inputted as a non-delay symbol; a delay symbol output process for delaying the symbol of the OFDM signal by a certain period of time T−Tg which is equivalent to a difference between a symbol period T of the inputted OFDM signal and a guard interval period Tg, and outputting the symbol as a delay symbol; a first calculation process for calculating a moving average integration value (first moving average integration value) of the non-delay symbol and the delay symbol during the guard interval period Tg; a second calculation process for calculating a moving average integration value (second moving average integration value) of the non-delay symbol and the delay symbol during an effective symbol period Tu subsequent to the guard interval period Tg; a third calculation process for calculating a ratio X between the first moving average integration value and the second moving average integration value; and a selection signal generation process for generating a selection signal for selecting one of a plurality of antennas based on the ratio X calculated by the third calculation means.

In accordance with another aspect of the present invention, there is provided a terrestrial digital receiver for receiving and demodulating an Orthogonal Frequency Division Multiplexing (OFDM) signal of a terrestrial digital broadcasting, and decoding it comprising: non-delay symbol output means for outputting a symbol of an OFDM signal included in the received terrestrial digital broadcasting as a non-delay symbol; delay symbol output means for delaying the symbol of the OFDM signal by a certain period of time T−Tg which is equivalent to a difference between a symbol period T of the OFDM signal and a guard interval period Tg, and outputting the symbol as a delay symbol; first calculation means for calculating a moving average integration value (first moving average integration value) of the non-delay symbol and the delay symbol during the guard interval period Tg; second calculation means for calculating a moving average integration value (second moving average integration value) of the non-delay symbol and the delay symbol during an effective symbol period Tu subsequent to the guard interval period Tg; third calculation means for calculating a ratio X between the first moving average integration value and the second moving average integration value; and selection signal generation means for generating a selection signal for selecting one of a plurality of antennas based on the ratio X calculated by the third calculation means.

In accordance with another aspect of the present invention, there is provided an Orthogonal Frequency Division Multiplexing (OFDM) receiver comprising: a plurality of antenna connection terminals to which an antenna can be connected; antenna switching means for selecting one antenna connection terminal among the plurality of antenna connection terminals so as to switch an antenna which is to receive an OFDM signal; symbol synchronization generation means for generating a symbol synchronizing signal which synchronizes a symbol based on a correlation value between an OFDM signal received with the antenna connected to the antenna connection terminal and a signal determined by delaying the OFDM signal by the effective symbol period; synchronizing clock generation means for generating a synchronizing clock signal which synchronizes a guard interval period and an effective symbol period from the symbol synchronizing signal generated by the symbol synchronization generation means; threshold storage means for storing a threshold; first integration means for determining a first integration value by sampling the symbol synchronizing signal generated by the symbol synchronization generation means with the synchronizing clock that synchronizes the guard interval period and that is generated by the synchronizing clock generation means; second integration means for determining a second integration value by sampling the symbol synchronizing signal generated by the symbol synchronization generation means with the synchronizing clock that synchronizes the effective symbol period and that is generated by the synchronizing clock generation means; and comparison means for determining a ratio between the first integration value and the second integration value, and comparing the ratio with the threshold stored in the threshold storage means; wherein, when the ratio between the first integration value and the second integration value is below the threshold as a result of the comparison by the comparison means, the antenna switch means switches the antenna.

In accordance with another aspect of the present invention, there is provided a An Orthogonal Frequency Division Multiplexing (OFDM) reception method comprising: an antenna switching process for selecting one antenna connection terminal among the plurality of antenna connection terminals so as to switch an antenna which is to receive an OFDM signal; a symbol synchronization generation process for generating a symbol synchronizing signal which synchronizes a symbol based on a correlation value between an OFDM signal received with the antenna connected to the antenna connection terminal and a signal determined by delaying the OFDM signal by the effective symbol period; a synchronizing clock generation process for generating a synchronizing clock signal which synchronizes a guard interval period and an effective symbol period from the symbol synchronizing signal generated by the symbol synchronization generation process; a threshold storage process for storing a threshold; a first integration process for determining a first integration value by sampling the symbol synchronizing signal generated by the symbol synchronization generation process with the synchronizing clock that synchronizes the guard interval period and that is generated by the synchronizing clock generation process; a second integration process for determining a second integration value by sampling the symbol synchronizing signal generated by the symbol synchronization generation process with the synchronizing clock that synchronizes the effective symbol period and that is generated by the synchronizing clock generation process; and a comparison process for determining a ratio between the first integration value and the second integration value, and comparing the ratio with the threshold stored in the threshold storage process; wherein, when the ratio between the first integration value and the second integration value is below the threshold as a result of the comparison by the comparison process, the antenna switch process switches the antenna.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings, as applied to a terrestrial digital broadcasting Orthogonal Frequency Division Multiplexing (OFDM) receiver.

In the following explanation, the various specific details or examples, numerical values or character strings and other illustrative notations are intended as reference for performing the concept of the present invention. Accordingly the ideology of this invention as a whole or in part is not limited to this. Additionally, although the explanation avoids covering the details regarding a well-known technique, a well-known architecture and a well-known circuit configuration (hereinafter denoted as a "common knowledge") for keeping the explanation succinct, these common knowledge particulars as a whole or in part are not intentionally excluded. Since a person skilled in the art can recognize such common knowledge at the time of filling the present invention, naturally certain references are included in the following explanation.

Figure 1:
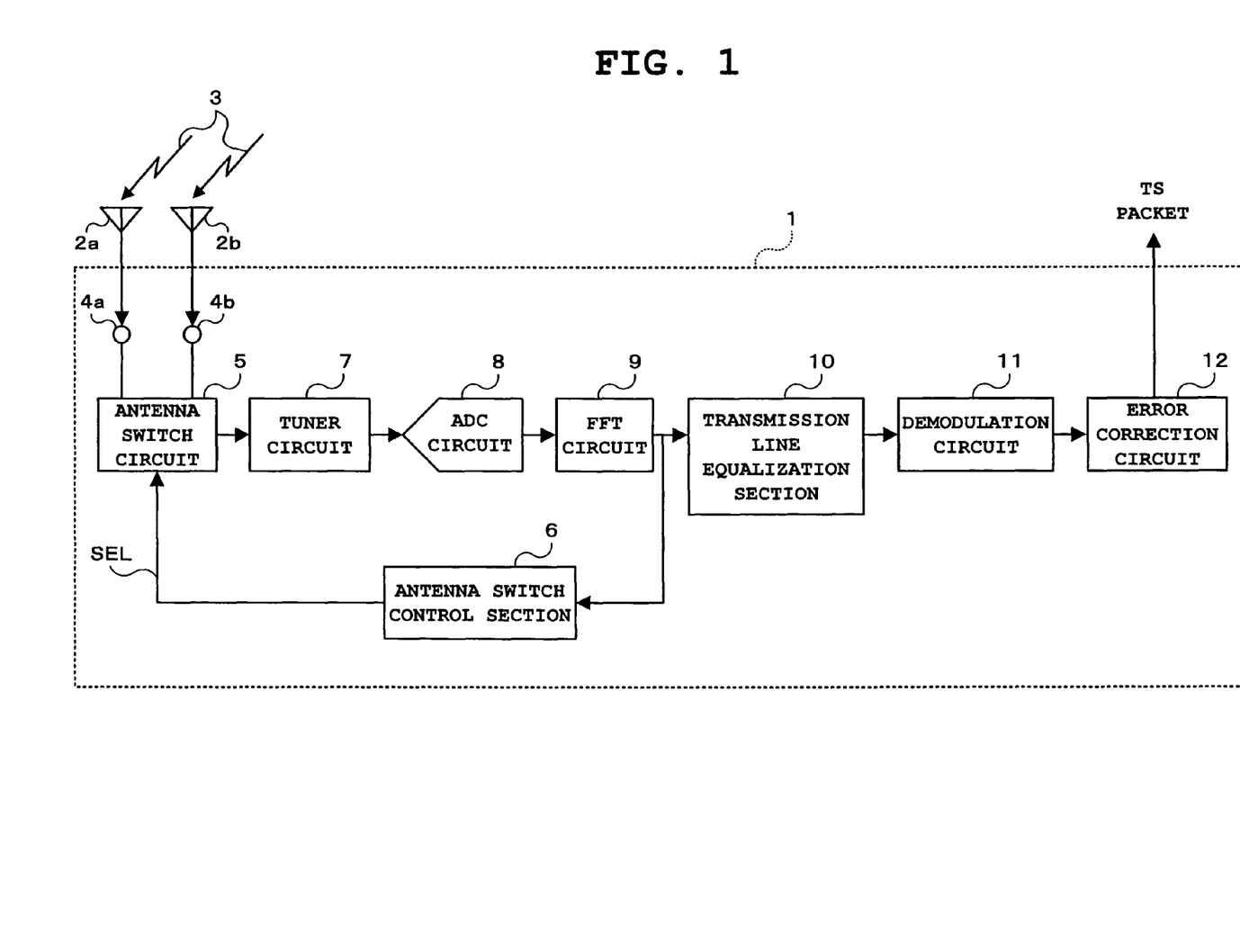
FIG. 1 is a schematic diagram of an OFDM receiver.

FIG. 1 is a schematic drawing of the OFDM receiver. The configuration of FIG. 1 shows blocks for receiving, demodulation and error correction of a terrestrial digital broadcast wave. FIG. 1 does not show a section for expanding the receive data after error correction (transport stream packet (TS packet) of MPEG) in the MPEG format and outputting it to a display unit.

Referring to FIG. 1, an OFDM receiver 1 includes a plurality of antenna terminals 4a, 4b to which received signals (terrestrial digital broadcast waves 3) from a plurality of terrestrial digital broadcast receiving antennas 2a, 2b (hereinafter simply denoted as "antennas") that are spatially displaced with one another are inputted, respectively. In the present embodiment, the number of the antennas is set to "2" for the sake of convenience, but it is not limited to this number. Any number equal to or larger than "2" is acceptable, and a number "3" or larger is not excluded.

The plurality of antenna terminals 4a, 4b are connected to an antenna switch circuit 5. The antenna switch circuit 5 selects one of the plurality of antenna terminals 4a, 4b in accordance with an antenna switch control signal SEL from an antenna switch control section 6, and outputs a receive signal from the selected antenna terminal to a tuner circuit 7.

The tuner circuit 7 selects a channel of the terrestrial digital broadcasting, and converts the received signal of the channel which it has selected (a high frequency signal in the 500 MHz band) into an Intermediate Frequency Signal (IF signal) (in the 500 KHz band) that the subsequent circuit easily processes, and outputs the converted signal to an ADC circuit 8. The ADC circuit 8 converts an analog IF signal into a digital signal, and outputs the signal to a Fast Fourier Transform (FFT) circuit 9. Details of the FFT circuit 9 and the subsequent circuits will be described with reference to FIG. 2 as follows.

Figure 2:
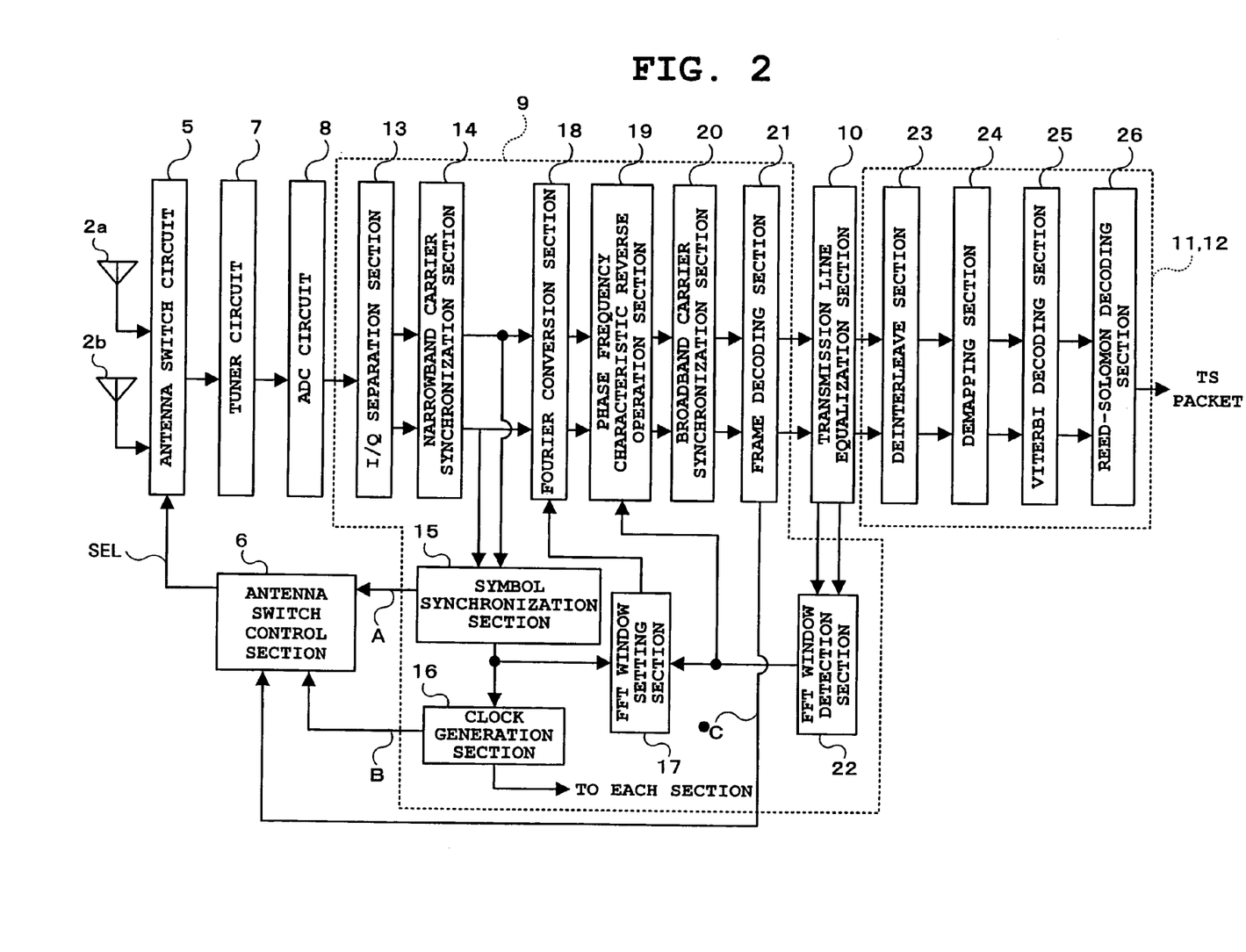
FIG. 2 is a detailed block diagram of the OFDM receiver shown in FIG. 1.

FIG. 2 is a detailed block diagram of the OFDM receiver shown in FIG. 1. Referring to FIG. 2, the FFT circuit 9 includes an I/Q separation section 13, a narrowband carrier synchronization section 14, a symbol synchronization section 15, a clock generation section 16, an FFT window setting section 17, a Fourier conversion section 18, a phase frequency characteristic reverse operation section 19, a broadband carrier synchronization section 20 and a frame decoding section 21. A demodulation circuit 11 and an error correction circuit 12 include a deinterleave section 23, a demapping section 24, a Viterbi decoding section 25 and a Reed-Solomon decoding section 26, respectively, although the two are shown as the same block for the sake of convenience of explanation.

After the OFDM signal is digitally converted in the ADC circuit 8, it is divided by the I/Q separation section 13 into an in-phase signal (Signal I) and an orthogonal signal (Signal Q)

with a phase difference by 90 degrees from the in-phase signal, and both signals are converted into complex OFDM signals.

The complex OFDM signal is sequentially segmented for each transmission symbol period where the transmission symbol period is set as one unit. As previously explained referring to FIGS. 8A and 8B, one transmission symbol period T is composed of a guard interval period Tg and an effective symbol period Tu subsequent thereto. One unit of an IFFT signal which is generated by Inverse Fourier Transform (IFFT) process of the transmitted data at the transmission end is allocated to the effective symbol period Tu. In addition, the 1/n (n=4, 8 or the like) portion of the rear end of the effective symbol period Tu subsequent to the guard interval period Tg is inserted to the guard interval period Tg as it is.

The complex OFDM signal from the I/Q separation section 13 is inputted to the narrowband carrier synchronization section 14, and distortion of frequency is corrected by the narrowband carrier synchronization section 14. The correction is performed so that frequency of each sub-carrier after fast fourier transformation by the Fourier conversion section 18 (to be described later) becomes an integral multiplication of a predetermined frequency (0.992 KHz at mode 3 of the terrestrial digital broadcasting).

At this time, distortion of the frequency on the complex OFDM signal is detected based on the size of correlation at the symbol synchronization section 15, and the narrowband carrier synchronization section 14 corrects distortion of the frequency upon receiving a feedback (the detected distortion of the frequency) from the symbol synchronization section 15. In other words, distortion of the frequency on the complex OFDM signal is detected based on a difference of the correlation value of the in-phase signal (signal I) and the correlation value of the orthogonal signal (signal Q) at a position where the correlation is the largest in the symbol synchronization section 15.

The specific method for correcting distortion of the frequency on the complex OFDM signal is to calculate an error of the narrowband carrier frequency to an accuracy of equal to or less than ±½ of the frequency interval of the sub-carrier (for example, 0.992 KHz), generate a signal corresponding to the error based on the error of the carrier frequency error in a frequency generator, and complex multiply the signal to the complex OFDM signal.

The complex OFDM signals for which distortion of the frequency has been corrected as described above are inputted to the symbol synchronization section 15 and the Fourier conversion section 18, respectively.

The symbol synchronization section 15 utilizes the fact that the guard interval period Tg in the complex OFDM signal is a copy of a part of the effective symbol period Tu so as to determine the correlation between an output signal of the narrowband carrier synchronization section 14 and a signal delayed from this output signal by the period substantially equivalent to the effective symbol period Tg. Next, it sets the position where the sum of the correlation value of the in-phase signal (Signal I) and the correlation value of the orthogonal signal (Signal Q) is the largest as a start timing of the effective symbol period Tu. Next, the symbol synchronization section 15 generates symbol synchronizing pulses at the start timing, and outputs them to the clock generation section 16 and the Fourier conversion section 18.

The clock generation section 16 generates a synchronizing clock corresponding to the symbol synchronizing pulse from the symbol synchronization section 15, and feeds the synchronizing clock to each section (Fourier conversion section 18, phase frequency characteristic reverse operation section 19, broadband carrier synchronization section 20 and the like).

The Fourier conversion section 18 performs FFT (Fourier transform) process to the complex OFDM signal for which distortion of the frequency has been corrected by the narrowband carrier synchronization section 14 based on the pulse outputted from the FFT window setting section 17, and thereby demodulating the complex OFDM signals in N series (432 channels at mode 3 of terrestrial digital broadcasting) which has been Orthogonal Frequency Division Multiplexed on each sub-carrier band at the transmission end.

The FFT window setting section 17 changes generation timing of the symbol synchronizing pulse to be outputted from the symbol synchronization section 15 based on a window position correction value which is acquired from an FFT window position detection section 22 to be described below, and thereby adjusting an FFT window position.

The Fourier conversion section 18 executes the FFT process to the complex OFDM signal based on the symbol synchronizing pulse that has been changed. In other words, the Fourier conversion section 18 sets, based on the window setting pulse, a time window (FET window) which starts at the head of the effective symbol period and has a time width of the effective symbol period. Next, it performs FFT process on the complex OFDM signal for a period of time corresponding to the FFT window, and thereby demodulating the complex OFDM signal of N series.

The phase frequency characteristic reverse operation section 19 multiplies the complex data string of the FET-processed complex OFDM signal with the phase rotation amount corresponding to the window position correction value acquired from the FFT window position detection section 22.

The broadband carrier synchronization process section 20 compensates the frequency shift between the demodulated complex OFDM of N series and the sub-carrier band so that the complex OFDM signal of N series that has been demodulated by the FFT process is correctly positioned in the frequency band of the corresponding sub-carrier. Specifically, the broadband carrier synchronization process section 20 detects a pilot signal that has been allocated to a particular sub-carrier at the transmission end in advance among the demodulated plurality of complex OFDM signals, and detects a shift between the sub-carrier band where the pilot signal has been detected and the sub-carrier band to which the pilot signal has been allocated at the transmission end, and thereby determining the frequency shift between the demodulated complex OFDM signal of N series and the sub-carrier band. Next, the broadband carrier synchronization process section 20 shifts the frequency shift by shifting the frequency band of the complex OFDM signal by the amount corresponding to the frequency shift.

Note that the pilot signal mentioned above refers to a signal which has been inserted into carrier bands at a constant interval (n, 2n, 3n . . . ; n=12 for terrestrial digital broadcasting) at the transmission end in advance among the carrier bands of N series. It is also denoted as a scattered pilot (SP) signal.

The frame decode process section 21 judges a synchronizing bit of a transmission control signal (TMCC) in the complex OFDM signal so as to synchronize the OFDM signals. At the same time, it accumulates the demodulated complex OFDM signal of N series for the amount corresponding to a predetermined number of symbols so as to constitute a single OFDM frame, and extracts the TMCC allocated to predetermined series (sub-carrier band) among them.

The transmission line equalization section 10 compensates distortion of the signal it has received in the transmission line.

In other words, the transmission line equalization section 10 detects a shift of the synchronizing signal (Signal I) and the orthogonal signal (Signal Q) that constitute the complex OFDM signal from an ideal point that is caused by influence of the ghost wave or the displacement of the FFT window position and the size of the shift, and compensates them.

The transmission line equalization section 10 estimates the phase shift of the synchronizing signal (Signal I) and the orthogonal signal (Signal Q) from the ideal point which is generated in the pilot signal as mentioned above, and performs equalization process to the in-phase signal (Signal I) and the orthogonal signal (Signal Q) so as to cancel the estimated phase shift. In addition, the transmission line equalization section 10 adjusts amplitude levels of the in-phase signal (Signal I) and the orthogonal signal (Signal Q) on each carrier band based on the amplitude level of the pilot signal, and further, feeds the extracted pilot signal to the FFT window position detection section 22.

The FFT window position detection section 22 uses the pilot signal extracted by the transmission line equalization section 10 (or the transmission line characteristic estimated by the transmission line equalization section 10) to detect the shift between the current FFT window position and the effective symbol periods of the regular transmission wave and other ghosts wave.

Further, the FFT window position detection section 22 judges whether a preceding ghost wave exceeding a predetermined threshold is included in the receive wave. If the preceding ghost wave exceeding a predetermined threshold is included, it calculates a compensation amount of the FFT window position based on the shift amount between the effective symbol period of the preceding ghost wave and the FFT window position.

The deinterleave section 23 cancels interleave in the frequency direction performed at the transmission end (sorting of the data series) and interleave in the time axis direction (sorting of the data in the time axis direction in each data series). (That is, it restores the sorting).

The demapping section 24 decodes data placed according to the modulation method, and the Viterbi decoding section 25 decodes the data that have been convolutionally coded at the transmission end. Further, the Reed-Solomon decoding section 26 decodes the data that have been Reed-Solomon encoded at the transmission end, generates a transport streams packet (TS packet) in the MPEG format, and outputs the TS packet to a display unit, not shown, through an MPEG decoder, also not shown.

Figure 3:
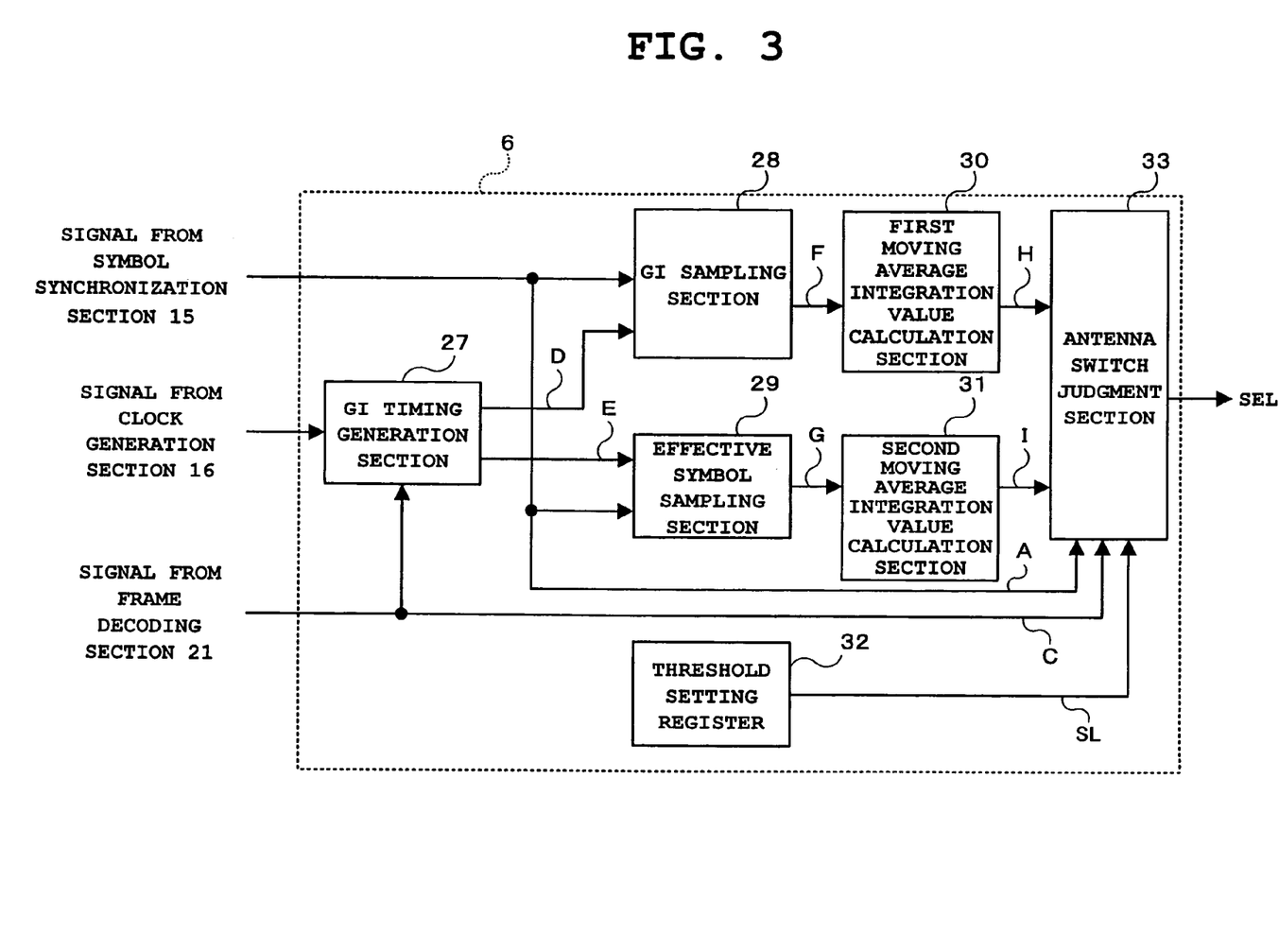
FIG. 3 is a schematic diagram of an antenna switch control section 6.

FIG. 3 is a schematic diagram of the antenna switch control section 6. Referring to FIG. 3, the antenna switch control section 6 includes a GI timing generation section 27, a GI sampling section 28, an effective symbol sampling section 29, a first moving average integration value calculation section 30, a second moving average integration value calculation section 31, a threshold setting register 32, and an antenna switch judgment section 33. Note that "GI" is the abbreviation of the guard interval.

Signal B (clock counter and clock signal) from the clock generation section 16 and Signal C (frame number) from the frame decoding section 21 have been inputted to the GI timing generation section 27. The GI timing generation section 27 generates Signal D (GI timing signal) and Signal E (effective symbol timing signal) based on these Signal B (clock counter and clock signal) and Signal C (frame number).

Signal A (symbol synchronizing pulse) from the symbol synchronization section 15 and Signal D (GI timing signal) from the GI timing generation section 27 have been inputted to the GI sampling section 28. The GI sampling section 28 samples the information of the guard interval period based on these Signal A (symbol synchronizing pulse) and Signal D (GI timing signal), and outputs it as Signal F.

Signal A (symbol synchronizing pulse) from the symbol synchronization section 15 and Signal E (effective symbol timing signal) from the GI timing generation section 27 have been inputted to the effective symbol sampling section 29. The effective symbol sampling section 29 samples the information of the effective symbol period based on these Signal A (symbol synchronizing pulse) and Signal E (effective symbol timing signal), and outputs it as Signal G.

Signal F (information of the guard interval period) from the GI sampling section 28 has been inputted to the first moving average integration value calculation section 30. The first moving average integration value calculation section 30 determines an integration value by moving averaging the information of the guard interval period for a predetermined period of time (integration period within guard interval Sa), and outputs it as Signal H (first moving average integration value).

Signal G (information of the effective symbol period) from the effective symbol sampling section 29 has been inputted to the second moving average integration value calculation section 31. The second moving average integration value calculation section 31 determines an integration value by moving averaging the information of the guard interval period for a predetermined period (integration period outside guard interval Sb), and outputs it as Signal I (second moving average integration value).

Threshold SL from the threshold setting register 32, Signal A (symbol synchronizing pulse) from the symbol synchronization section 15, Signal C (frame number) from the frame decoding section 21, Signal H (first moving average integration value) from the first moving average integration value calculation section 30 and Signal I (second moving average integration value) from the second moving average integration value calculation section 31 have been inputted to the antenna switch judgment section 33. The antenna switch judgment section 33 determines the ratio between the first moving average integration value and the second moving average integration value, compares the ratio with the threshold SL to determine whether the state of the transmission line is good. If not good, it outputs a signal for prompting switching of the antenna (antenna switch control signal SEL) to the antenna switch control section 6.

As mentioned above, one of the functions of the antenna switch control section 6 is to utilize the symbol synchronization timing of the symbol synchronization section 15 to integrate the correlation values used by the symbol synchronization section 15, separately for the correlation value of the guard interval period and for correlation value of the other period, based on the information of a mode of the transmission control signal (TMCC) and of the guard interval length that have been acquired from the frame decode process section 21.

Figure 4:
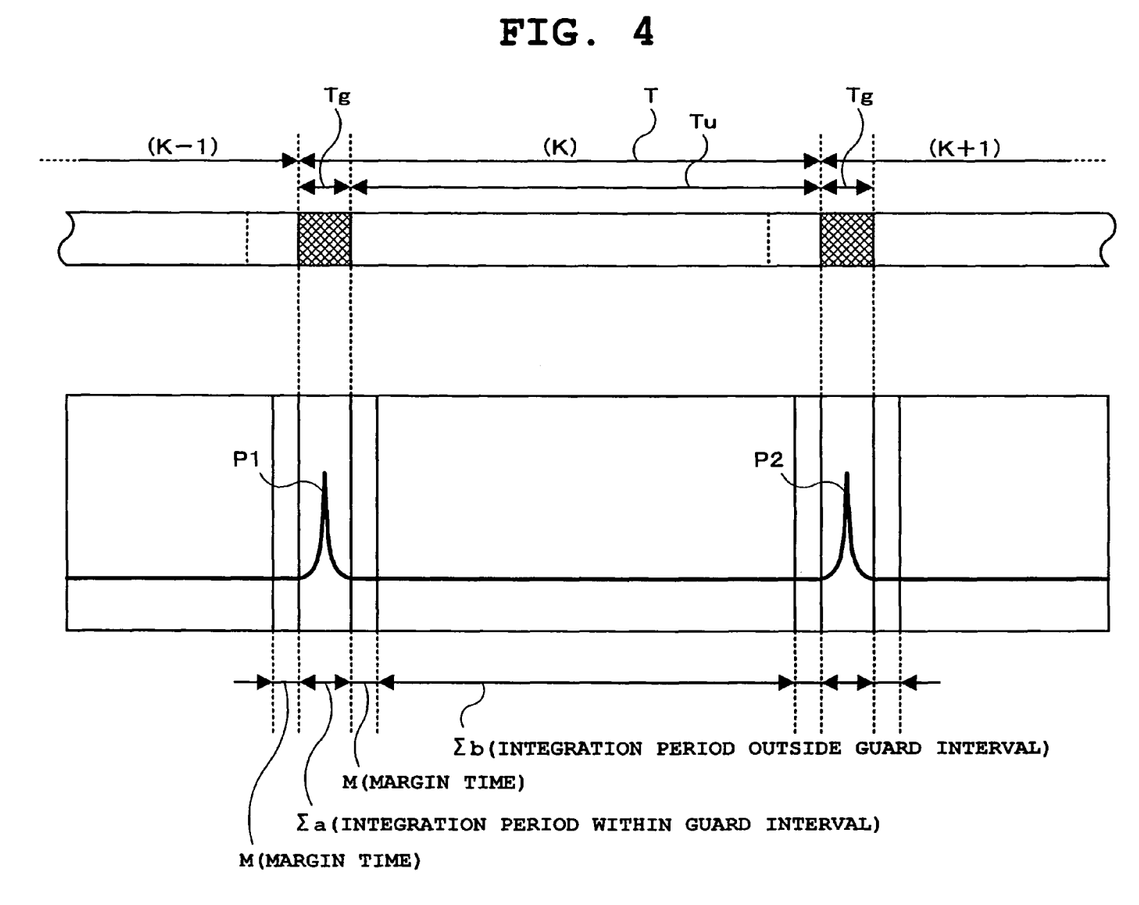
FIG. 4 is an explanatory diagram of an integration period.

FIG. 4 is an explanatory diagram of the integration period. In the present embodiment, two integration periods as shown in FIG. 4 are specified. The first integration period is an "integration period within guard interval Sa", and the second integration period is an "integration period outside guard interval Sb".

The integration period within guard interval Sa is identical with the guard interval period Tg of the symbol, and the integration period outside guard interval Sb refers to the period other than the integration period within guard interval Sa, that is, the period determined by excluding a certain margin period M from the effective symbol period Tu. Note that the margin period M refers to an allowance period to eliminate the influence of the multipath. In other words, the guard interval period Tg may be advanced or delayed in terms of time affected by multipath, and thus may be inserted into the head or the end of the effective symbol period Tu. The margin period M is to eliminate such influence.

The antenna switch control section 6 integrates the correlation values (first moving average integration value and second moving average integration value) according to the two specified integration periods Sa, Sb. A solid line with two peaks P1, P2 in FIG. 4 shows the correlation value between the non-delay symbol and the delay symbol (which is delayed from the non-delay symbol by T−Tg). The portions of the peaks P1, P2 showing the largest correlation value correspond to the guard interval periods Tg, respectively. This is because the information of the guard interval period Tg is identical with the information of the end of the effective symbol period Tu subsequent to the guard interval period Tg.

Figure 5:
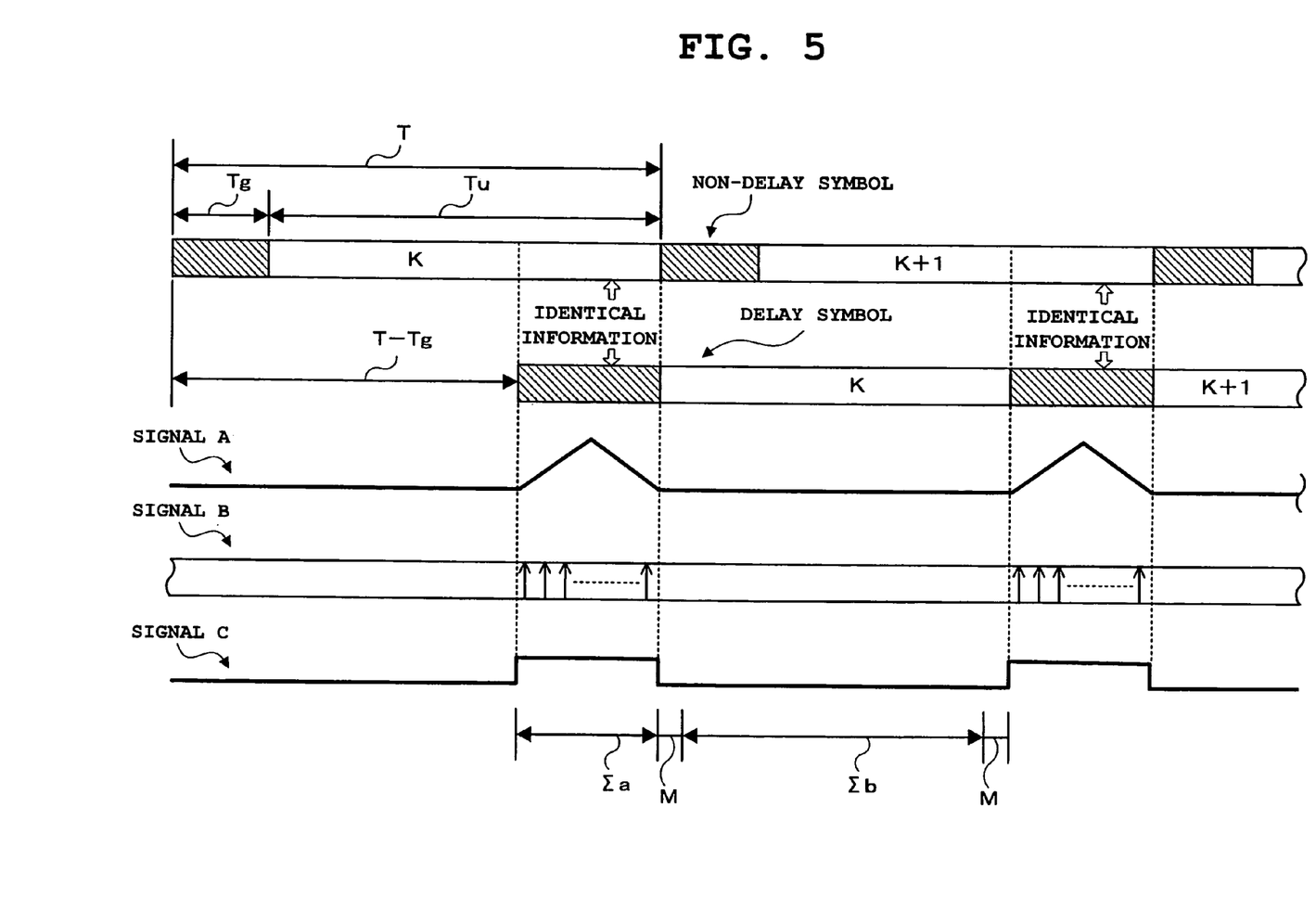
FIG. 5 is a conceptual drawing for integration.

FIG. 5 is a conceptual drawing for integration. Referring to FIG. 5, the delay symbol is delayed from the non-delay symbol by a predetermined period of time (T−Tg), and the guard interval period Tg of the delay symbol and the end of the effective symbol period Tu of the non-delay symbol (copy source of the information of the guard interval period Tg) are overlapped with each other on the time axis. The antenna switch control section 6 calculates the moving average integration values for these two symbols (non-delay symbol and delay symbol) for the two specified periods (integration period within guard interval Sa and integration period outside guard interval Sb). The first moving average integration value is a moving average integration value for the integration period within guard interval Sa, and the second moving average integration value is a moving average integration value for the integration period outside guard interval Sb.

Identification of the two integration periods Sa, Sb is performed based on Signal A (symbol synchronizing pulse) from the symbol synchronization section 15, and integration process is performed based on Signal B (clock counter and clock signal) from the clock generation section 16. In addition, to what number of the symbol integration process is identified based on Signal C (frame number) from the frame decoding section 21.

Figure 6:
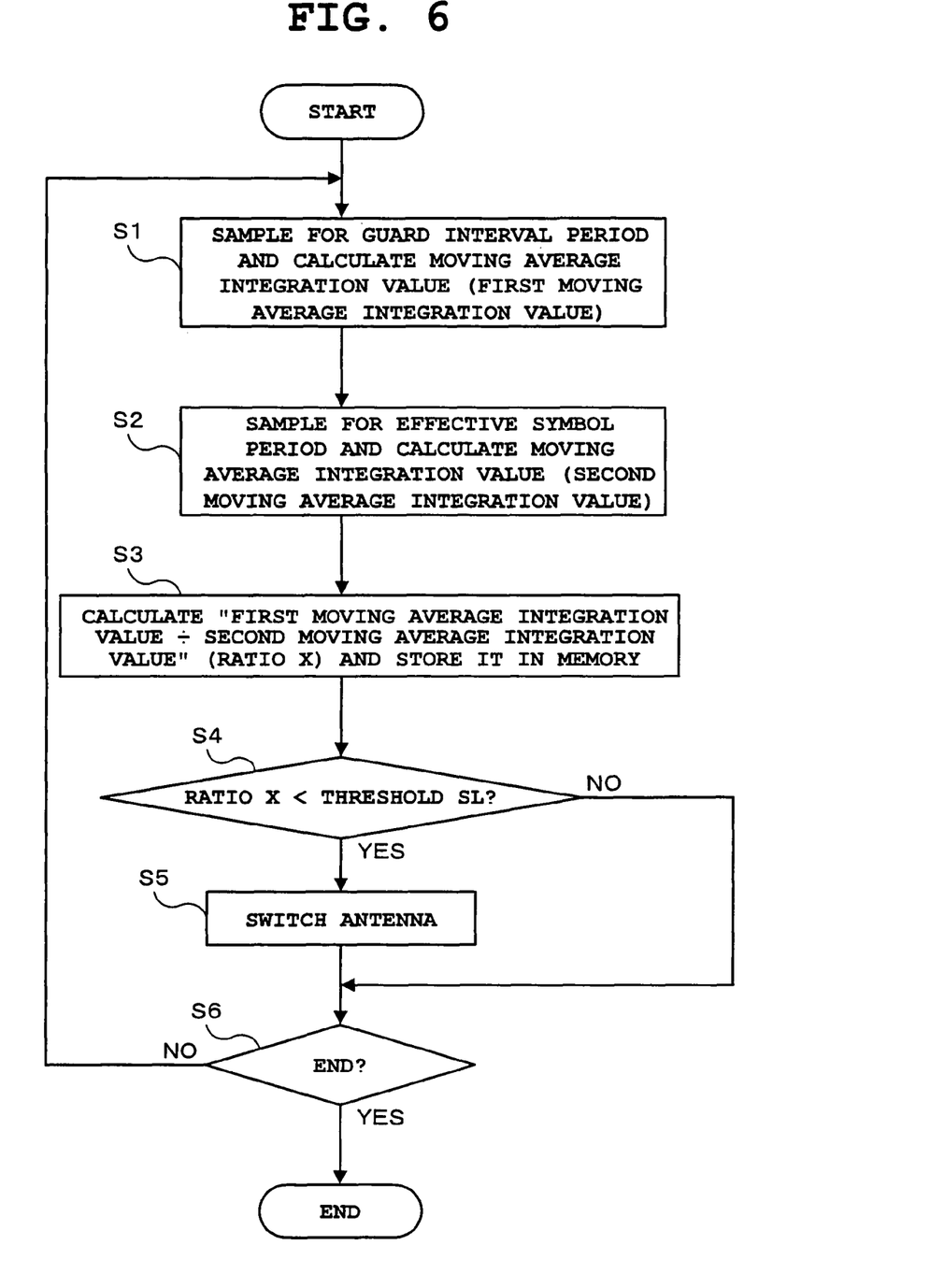
FIG. 6 is an operational flow chart of the antenna switch control section 6.

FIG. 6 is an operational flow chart of the antenna switch control section 6. Referring to FIG. 6, the antenna switch control section 6 first performs moving average integration process for the integration period within guard interval Sa to determine the first moving average integration value (Step S1), and next, performs moving average integration process for the integration period outside guard interval Sb to determine the second moving average integration value (Step S2). Next, it calculates "first moving average integration value÷second moving average integration value", that is, the ratio X of the two integration values, and stores the calculation result (ratio X) in the memory (Step S3). Next, the antenna switch control section 6 compares the ratio X which has been stored in the memory and the threshold SL, and judges whether or not "X<SL" (Step S4). In the case of "X<SL", the antenna switch control section 6 outputs a signal prompting switching of the antenna (antenna switch control signal SEL) to the antenna switch circuit 5 (Step 5), and continues the operation as described above until an instruction to end is given (Step S6).

Figure 7A:
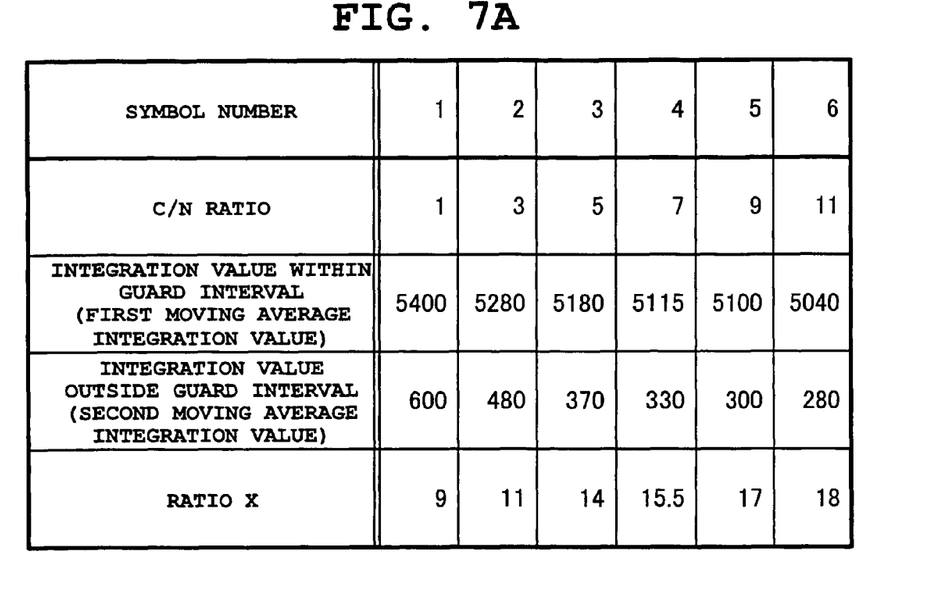
FIG. 7A is a diagram showing an example of calculation results of a first and second moving average integration values.

FIG. 7A is a diagram showing an example of calculation results of the first and second moving average integration values. Herein, the calculation results for Symbol numbers 1 to 6 are shown for the sake of convenience. In other words, for Symbol number 1, the C/N ratio is 1, the integration result for the integration period within guard interval Sa (first moving average integration value) is 5400, the integration result for the integration period outside guard interval Sb (second moving average integration value) is 600, and the ratio therebetween (corresponding to X as above) is 9. Further, for Symbol number 2, the C/N ratio is 3, the integration result for the integration period within guard interval Sa (first moving average integration value) is 5280, the integration result for the integration period outside guard interval Sb (second moving average integration value) is 480, and the ratio therebetween (corresponding to X as above) is 11. Further, for Symbol number 3, the C/N ratio is 5, the integration result for the integration period within guard interval Sa (first moving average integration value) is 5180, the integration result for the integration period outside guard interval Sb (second moving average integration value) is 370, and the ratio therebetween (corresponding to X as above) is 14. Further, for Symbol number 4, the C/N ratio is 7, the integration result for the integration period within guard interval Sa (first moving average integration value) is 5115, the integration result for the integration period outside guard interval Sb (second moving average integration value) is 330, and the ratio therebetween (corresponding to X as above) is 15.5. Further, for Symbol number 5, the C/N ratio is 9, the integration result for the integration period within guard interval Sa (first moving average integration value) is 5100, the integration result for the integration period outside guard interval Sb (second moving average integration value) is 300, and the ratio therebetween (corresponding to X as above) is 17. Further, for Symbol number 6, the C/N ratio is 11, the integration result for the integration period within guard interval Sa (first moving average integration value) is 5040, the integration result for the integration period outside guard interval Sb (second moving average integration value) is 280, and the ratio therebetween (corresponding to X as above) is 18.

Meanwhile, referring to FIG. 7A, a relation can be observed between the C/N ratio and the ratio X to some extent. In other words, as the ratio X increases the CN ratio can also increase.

Figure 7B:
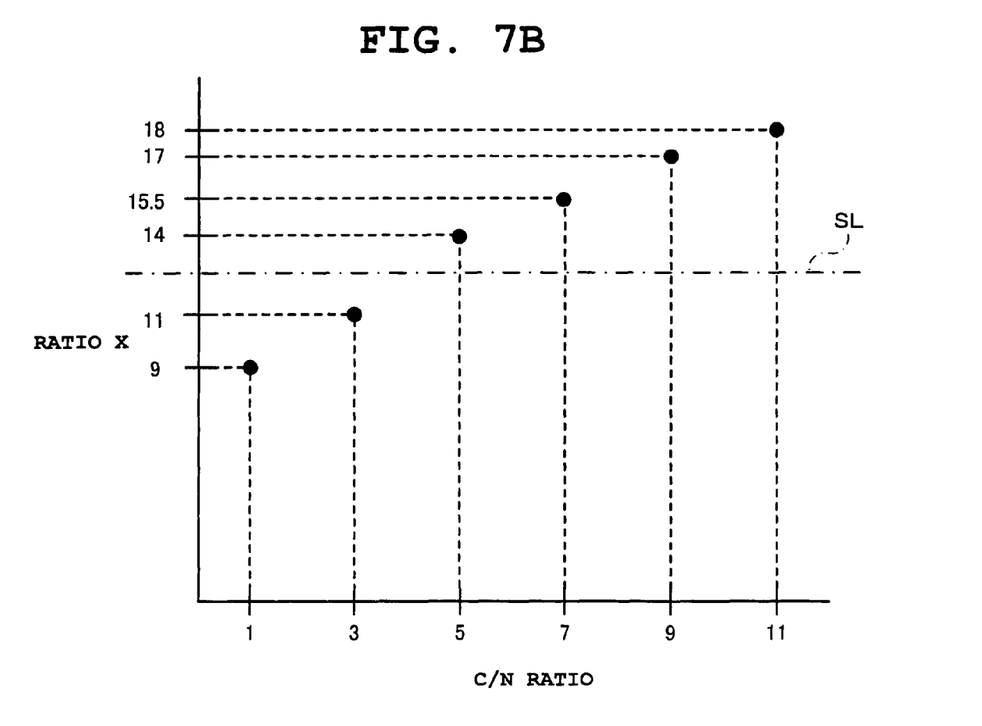
FIG. 7B shows the relation between a ratio X and a C/N ratio.

FIG. 7B shows the relation between the ratio X and the C/N ratio. In FIG. 7B, the vertical axis represents the ratio X and the horizontal axis represents the CN ratio. As also understood by FIG. 7B, the CN ratio increases as the ratio X increases. Meanwhile, as explained previously, since the CN ratio is the ratio between additive noise electricity (N) and signal electricity (C) at the reception point, it is preferable that the C/N ratio is as large as possible. Assume that the threshold SL is set to "Ratio X≈13" for the sake of convenience. In the case of X=14, X=15.5, X=17 or X=18 where X exceeds the threshold SL, the state of the transmission line is considered good and the antenna will not be switched. (The antenna which is currently being used will be used as it is.) On the other hand, in the case of X=11 or X=9 where X is below the threshold SL, the state of the transmission line is considered poor and the antenna will be switched. This is because in Step 4 in FIG. 6, in the case of "X<SL", a signal for prompting switching of the antenna (antenna switch control signal SEL) is outputted to the antenna switch circuit 5.

As mentioned above, the present embodiment uses the fact that a relation is established to some extent between the value determined by dividing the integration result of the integration period within guard interval Sa (first moving average integration value) by the integration result of the integration period outside in a guard interval Sb (second moving average integration value) (that is, the ratio X) and the CN ratio, and performs selection diversity based on the ratio X.

This will be hereinafter explained in detail. First, the integration result of the integration period within guard interval Sa (first moving average integration value) is the moving average integration value of the information of the guard interval period and the information of the end of the effective symbol period subsequent to the guard interval. Since the two pieces of information are identical (and therefore are correlated), the first moving average integration value is high as a matter of course.

On the other hand, the integration result for the integration period outside guard interval Sb (the second moving average integration value) is the integration result of the non-delay symbol and the delay symbol for the period determined by excluding the margin period M from the effective symbol period Tu. The effective symbol periods Tu of the non-delay symbol and the delay symbol are shifted from each other by the time Tg in the fore and aft direction. Accordingly, no correlation should be normally observed between the two (that is, the information of the respective effective symbol periods of the non-delay symbol and the delay symbol).

However, according to the experiments made by the inventors of the present invention, in the case where a strong white noise is applied due to fluctuation of the transmission line (where influence by the multipath is a code interference between many carriers, and therefore is considered as a white noise), a correlation to some extent was sometimes observed even during the integration period outside guard interval Sb.

The estimated reason for this is as follows. The information that is originally included in the effective symbol is now assumed to be "true information". In the case where there is no multipath (no white noise), even if the same information (true information) is included in the respective effective symbols of the non-delay symbol and the delay symbol, the integration result for the integration period outside guard interval Sb (second moving average integration value) does not become large. This is because the effective symbol periods Tu of the non-delay symbol and the delay symbol are shifted from each other by Time Tg in the fore and aft direction as mentioned above. However, when information caused by white noise (hereinafter denoted as false information) is applied to the true information as mentioned above, stochastically, false information may be sometimes misunderstood as true information. It is expected that, in accordance with the extent of this misunderstanding, integration result for the integration period outside guard interval Sb (second moving average integration value) becomes large.

As mentioned above, the effective symbol periods Tu of the non-delay symbol and the delay symbol have been conventionally considered as almost commonsense as "not-correlated" with each other. However, the inventors of the present invention paid their attention to the fact that an apparent correlation is observed depending on the size of the multipath, and conceived that understanding of the state of the transmission line utilizing the phenomenon enables switching the antenna with the selected diversity even during the effective symbol period.

In other words, as shown in FIG. 7B as previously mentioned, the ratio X between the integration value within guard interval Sa and the integration value outside guard interval Sb decreases, as the CN ratio is deteriorated (as the CN ratio decreases). Accordingly, a pseudo signal state can be known based on the ratio X. Therefore, the antenna switch control circuit 6 may be configured such that it performs integration for the integration periods as mentioned above (Sa, Sb) (calculation of the first moving average integration value and the second moving average integration value) and calculates the ratio X, estimates the current state of the input signal, and, as necessary, outputs a signal for switching the antenna (antenna switch control signal SEL) to the antenna switch circuit 5.

Specifically, first, when synchronization is started, the TMCC information and the symbol timing are acquired. Based on the information, integration for the above-mentioned integration periods (Sa, Sb) is performed and the ratio X is calculated. Next, the threshold SL is set with the ratio X satisfying the required C/N ratio (that is, the minimum C/N ratio at which no error is generated in the TS packet) as the entire circuit. If the calculated ratio X is below the threshold SL, the antenna switch control signal SEL is reversed and the reversed signal is outputted to the antenna switch circuit 5. As a result of this, if the characteristic of the antenna after the switch is more suitable for the current transmission line than the characteristic of the antenna before the switch, that is, if the required C/N ratio is satisfied, the state of the transmission line is stable and receiving can be continued.

Further, there is no doubt that the characteristic of the antenna after the switch may also be below the threshold. Since this state shows that the state of the transmission line is considerably poor whichever antenna is used, it is only necessary to repeat inversion. If the state of the transmission line gets better and the antenna satisfying the required C/N ratio is generated, the inversion is complete with the antenna and receiving can be resumed. It goes without saying that the inversion should be performed at a timing that affects the received signal least, that is, during the guard interval period or the like.

As mentioned above, the present embodiment enables judgment on whether the transmission state is good based on the ratio X (which is equivalent to the judgment on whether the C/N ratio is good). In addition, even if the state of the transmission line fluctuates suddenly during the effective symbol period Tg, the present embodiment can responded to the fluctuation quickly, and therefore does not cause the instantaneous symbol loss. Further, combination of the art of the present embodiment and the conventional prior art (that is, judgment on whether the state of the transmission line is good only for the guard interval period Tg) enables judgment on whether the transmission state is good for the almost entire period of the symbol, and thereby taking more reliable countermeasures against instantaneous symbol loss.

Accordingly, the present embodiment enables application of antenna diversity for selecting a plurality of antennas, that is, selection diversity which does not increase hardware scale, and enables switching (selection) of the antenna even during the effective symbol period which is other than the guard interval. As a result of this, the present embodiment enables providing an OFDM receiver, an OFDM reception method and a terrestrial digital receiver with excellent instantaneous antenna selection and at a low cost.

While the present invention has been described with reference to the preferred embodiments, it is intended that the invention be not limited by any of the details of the description therein but includes all the embodiments which fall within the scope of the appended claims.

What is claimed is:

1. An Orthogonal Frequency Division Multiplexing (OFDM) receiver comprising:

non-delay symbol output means for outputting a symbol of an OFDM signal that has been inputted as a non-delay symbol;

delay symbol output means for delaying the symbol of the OFDM signal by a certain period of time T−Tg which is equivalent to a difference between a symbol period T of the inputted OFDM signal and a guard interval period Tg, and outputting the symbol as a delay symbol;

first calculation means for calculating a first moving average integration value of the non-delay symbol and the delay symbol during the guard interval period Tg;

second calculation means for calculating a second moving average integration value of the non-delay symbol and the delay symbol during an effective symbol period Tu subsequent to the guard interval period Tg;

third calculation means for calculating a ratio X between the first moving average integration value and the second moving average integration value; and selection signal generation means for generating a selection signal for selecting one of a plurality of antennas based on the ratio X calculated by the third calculation means;

wherein the selection signal generation means generates a signal for switching an antenna when the ratio X calculated by the third calculation means is below a predetermined threshold SL.

2. The OFDM receiver according to claim 1, wherein the second calculation means calculates the second moving average integration value of the non-delay symbol and the delay symbol during a period acquired by excluding a certain margin time period M from the head of the effective symbol period subsequent to the guard interval period Tg.

3. An Orthogonal Frequency Division Multiplexing (OFDM) reception method comprising:

outputting a symbol of an OFDM signal that has been inputted as a non-delay symbol;

delaying the symbol of the OFDM signal by a certain period of time T−Tg which is equivalent to a difference between a symbol period T of the inputted OFDM signal and a guard interval period Tg, and outputting the symbol as a delay symbol;

calculating a first moving average integration value of the non-delay symbol and the delay symbol during the guard interval period Tg;

calculating a second moving average integration value of the non-delay symbol and the delay symbol during an effective symbol period Tu subsequent to the guard interval period Tg;

calculating a ratio X between the first moving average integration value and the second moving average integration value; and generating a selection signal for selecting one of a plurality of antennas based on the calculated ratio X;

wherein a signal for switching an antenna is generated when the calculated ratio X is below a predetermined threshold SL.

4. The OFDM reception method according to claim 3, wherein the second calculation process calculates the second moving average integration value of the non-delay symbol and the delay symbol during a period acquired by excluding a certain margin time period M from the head of the effective symbol period subsequent to the guard interval period Tg.

5. A terrestrial digital receiver for receiving and demodulating an Orthogonal Frequency Division Multiplexing (OFDM) signal of a terrestrial digital broadcasting, and decoding it, comprising:

non-delay symbol output means for outputting a symbol of an OFDM signal included in the received terrestrial digital broadcasting as a non-delay symbol;

delay symbol output means for delaying the symbol of the OFDM signal by a certain period of time T−Tg which is equivalent to a difference between a symbol period T of the OFDM signal and a guard interval period Tg, and outputting the symbol as a delay symbol;

first calculation means for calculating a first moving average integration value of the non-delay symbol and the delay symbol during the guard interval period Tg;

second calculation means for calculating a second moving average integration value of the non-delay symbol and the delay symbol during an effective symbol period Tu subsequent to the guard interval period Tg;

third calculation means for calculating a ratio X between the first moving average integration value and the second moving average integration value; and selection signal generation means for generating a selection signal for selecting one of a plurality of antennas based on the ratio X calculated by the third calculation means;

wherein the selection signal generation means generates a signal for switching an antenna when the ratio X calculated by the third calculation means is below a predetermined threshold SL.

6. The terrestrial digital receiver according to claim 5, wherein the second calculation means calculates the second moving average integration value of the non-delay symbol and the delay symbol during a period acquired by excluding a certain margin time period M from the head of the effective symbol period subsequent to the guard interval period Tg.

7. An Orthogonal Frequency Division Multiplexing (OFDM) receiver comprising:

a plurality of antenna connection terminals to which an antenna can be connected;

antenna switching means for selecting one antenna connection terminal among the plurality of antenna connection terminals so as to switch to an antenna which is to receive an OFDM signal;

symbol synchronization generation means for generating a symbol synchronizing signal which synchronizes a symbol based on a correlation value between an OFDM signal received with the antenna connected to the antenna connection terminal and a signal determined by delaying the OFDM signal by the effective symbol period;

synchronizing clock generation means for generating a synchronizing clock signal which synchronizes a guard interval period and an effective symbol period from the symbol synchronizing signal generated by the symbol synchronization generation means;

threshold storage means for storing a threshold;

first integration means for determining a first integration value by sampling the symbol synchronizing signal generated by the symbol synchronization generation means with the synchronizing clock that synchronizes the guard interval period and that is generated by the synchronizing clock generation means;

second integration means for determining a second integration value by sampling the symbol synchronizing signal generated by the symbol synchronization generation means with the synchronizing clock that synchronizes the effective symbol period and that is generated by the synchronizing clock generation means; and comparison means for determining a ratio between the first integration value and the second integration value, and comparing the ratio with the threshold stored in the threshold storage means;

wherein, when the ratio between the first integration value and the second integration value is below the threshold as a result of the comparison by the comparison means, the antenna switch means switches the antenna; and wherein the comparison means determines a value by dividing the first integration value by the second integration value as the ratio between the first integration value and the second integration value.

8. The OFDM receiver according to claim 7, wherein the switching of the antenna by the antenna switch means is performed during the guard interval period.

9. An Orthogonal Frequency Division Multiplexing (OFDM) reception method comprising:

selecting one antenna connection terminal among a plurality of antenna connection terminals so as to switch to an antenna which is to receive an OFDM signal;

generating a symbol synchronizing signal which synchronizes a symbol based on a correlation value between an OFDM signal received with an antenna connected to the antenna connection terminal and a signal determined by delaying the OFDM signal by the effective symbol period;

generating a synchronizing clock signal which synchronizes a guard interval period and an effective symbol period from the generated symbol synchronizing signal;

storing a threshold;

determining a first integration value by sampling the generated symbol synchronizing signal with the generated synchronizing clock that synchronizes the guard interval period;

determining a second integration value by sampling the generated symbol synchronizing signal with the generated synchronizing clock that synchronizes the effective symbol period; and determining a ratio between the first integration value and the second integration value, and comparing the ratio with the stored threshold;

wherein, when the ratio between the first integration value and the second integration value is below the threshold as a result of the comparing, the antenna is switched; and wherein a value is determined by dividing the first integration value by the second integration value as the ratio between the first integration value and the second integration value.

10. The OFDM reception method according to claim 9, wherein the switching of the antenna is performed during the guard interval period.

* * * * *